(12) United States Patent
Chamberlain et al.

(10) Patent No.: US 9,573,354 B2
(45) Date of Patent: *Feb. 21, 2017

(54) LAYERED DEPOSITION FOR REACTIVE JOINING OF COMPOSITES

(71) Applicant: Rolls-Royce Corporation, Indianapolis, IN (US)

(72) Inventors: Adam Lee Chamberlain, Mooresville, IN (US); Andrew Joseph Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/097,873

(22) Filed: Dec. 5, 2013

(65) Prior Publication Data

US 2014/0272431 A1    Sep. 18, 2014

Related U.S. Application Data

(60) Provisional application No. 61/802,233, filed on Mar. 15, 2013.

(51) Int. Cl.
   *C03B 29/00*     (2006.01)
   *C04B 37/00*     (2006.01)
   (Continued)

(52) U.S. Cl.
   CPC ..... *B32B 38/0008* (2013.01); *C04B 35/62222* (2013.01); *C04B 35/65* (2013.01);
   (Continued)

(58) Field of Classification Search
   CPC ... B23K 1/0006; B23K 20/165; B23K 1/0018; B22F 3/23; C04B 37/02; C04B 37/003; C04B 37/023; C04B 35/6267; C04B 35/65; C04B 35/591; C04B 35/573; C04B 35/01;C04B 35/515; C04B 35/56; C04B 35/5611; C04B 35/563; C04B 35/62222; C04B 2235/616; C04B 2237/02; C04B 2237/083; C04B 2237/095; C04B 2237/58; C04B 2237/597; C04B 2237/72; F01D 5/282; F01D 5/284; F05D 2300/6033
   See application file for complete search history.

(56) References Cited

U.S. PATENT DOCUMENTS

4,800,065 A * 1/1989 Christodoulou .......... B22F 3/23
                                                    420/129
5,306,565 A    4/1994 Corbin et al.
(Continued)

FOREIGN PATENT DOCUMENTS

| DE | 19734211 A1 | 2/1999 |
|----|-------------|--------|
| GB | 925509 | 7/1960 |
| WO | 2013075155 A1 | 5/2013 |

OTHER PUBLICATIONS

Rabin, "Joining of fiber-reinforced SiC composites by in Situ Reaction Methods," Materials Science and Engineering, May 30, 1990, 5 pp.
(Continued)

*Primary Examiner* — Alex Efta
(74) *Attorney, Agent, or Firm* — Shumaker & Sieffert, P.A.

(57) ABSTRACT

A method including applying layers of multiple constituents where the constituents are capable of producing a non-equilibrium condition on the contacting surfaces of a ceramic matrix composite component and a gas turbine engine component where one outer coating includes a first constituent and the other outer coating includes a second constituent; forming a component assembly with the ceramic matrix composite component coupled to the gas turbine engine component with contact between the outer
(Continued)

coatings; adding an energy to facilitate an equilibrium reaction between the first constituent of the first outer coating and the second constituent of the second outer coating; and as a result of adding the energy, forming a bond structure in the component assembly with a product of the equilibrium reaction where the bond structure affixes the ceramic matrix composite component to the gas turbine engine component between the first constituent and the second constituent.

15 Claims, 3 Drawing Sheets

(51) Int. Cl.
| | |
|---|---|
| *B32B 37/00* | (2006.01) |
| *B32B 38/00* | (2006.01) |
| *C04B 35/622* | (2006.01) |
| *C04B 35/65* | (2006.01) |
| *C04B 37/02* | (2006.01) |
| *C04B 35/563* | (2006.01) |
| *C04B 35/515* | (2006.01) |
| *C04B 35/56* | (2006.01) |
| *C04B 35/01* | (2006.01) |
| *C04B 35/573* | (2006.01) |
| *F01D 5/28* | (2006.01) |

(52) U.S. Cl.
CPC .......... *C04B 37/003* (2013.01); *C04B 37/005* (2013.01); *C04B 37/006* (2013.01); *C04B 37/025* (2013.01); *C04B 37/026* (2013.01); C04B 35/01 (2013.01); C04B 35/515 (2013.01); C04B 35/56 (2013.01); C04B 35/563 (2013.01); C04B 35/5611 (2013.01); C04B 35/573 (2013.01); C04B 2235/48 (2013.01); C04B 2235/616 (2013.01); C04B 2235/6581 (2013.01); C04B 2235/6582 (2013.01); C04B 2235/665 (2013.01); C04B 2235/666 (2013.01); C04B 2235/96 (2013.01); C04B 2235/963 (2013.01); C04B 2237/02 (2013.01); C04B 2237/06 (2013.01); C04B 2237/08 (2013.01); C04B 2237/083 (2013.01); C04B 2237/086 (2013.01); C04B 2237/095 (2013.01); C04B 2237/121 (2013.01); C04B 2237/122 (2013.01); C04B 2237/123 (2013.01); C04B 2237/16 (2013.01); C04B 2237/38 (2013.01); *C04B 2237/52* (2013.01); *C04B 2237/55* (2013.01); *C04B 2237/58* (2013.01); *C04B 2237/60* (2013.01); *C04B 2237/61* (2013.01); *C04B 2237/70* (2013.01); *C04B 2237/708* (2013.01); *C04B 2237/72* (2013.01); *C04B 2237/78* (2013.01); *F01D 5/282* (2013.01); *F01D 5/284* (2013.01); *F05D 2300/6033* (2013.01)

(56) References Cited

U.S. PATENT DOCUMENTS

| | | | | |
|---|---|---|---|---|
| 5,381,944 | A | * | 1/1995 | Makowiecki ........ B23K 35/001 228/124.5 |
| 5,503,703 | A | * | 4/1996 | Dahotre ................ C04B 37/005 156/272.8 |
| 5,538,795 | A | * | 7/1996 | Barbee, Jr. .............. C06B 45/14 228/124.5 |
| 5,599,468 | A | | 2/1997 | Mako et al. |
| 5,942,064 | A | | 8/1999 | Krenkel et al. |
| 6,294,125 | B1 | | 9/2001 | Bridgewater et al. |
| 2002/0182362 | A1 | | 12/2002 | Stowell et al. |
| 2003/0006269 | A1 | | 1/2003 | Horner et al. |
| 2008/0190552 | A1 | | 8/2008 | Bouillon et al. |
| 2010/0038409 | A1 | * | 2/2010 | Wilden ................ B23K 1/0006 228/121 |
| 2014/0272248 | A1 | * | 9/2014 | Chamberlain .......... F01D 5/005 428/63 |

OTHER PUBLICATIONS

Office Action from U.S. Appl. No. 14/141,976, dated Oct. 8, 2015, 8 pp.
International Search Report and Written Opinion, mailed Apr. 1, 2014 for International Application No. PCT/US2013/075568, filed Dec. 17, 2013.
Notice of Allowance from U.S. Appl. No. 14/141,976, mailed Feb. 11, 2016, 8 pp.
International Preliminary Report on Patentability from International Application No. PCT/US2013/075568, mailed Sep. 15, 2015, 09 pp.
Office Action from counterpart European Application No. 13818109A dated Nov. 5, 2015, 2 pp.
Response to Search Opinion dated Nov. 5, 2015, from counterpart European Application No. 13818109.4, filed Apr. 20, 2016, 12 pp.
Response to the Office Action mailed Oct. 8, 2015, from U.S Appl. No. 14/141,976, filed Jan. 5, 2016, 11 pp.

* cited by examiner

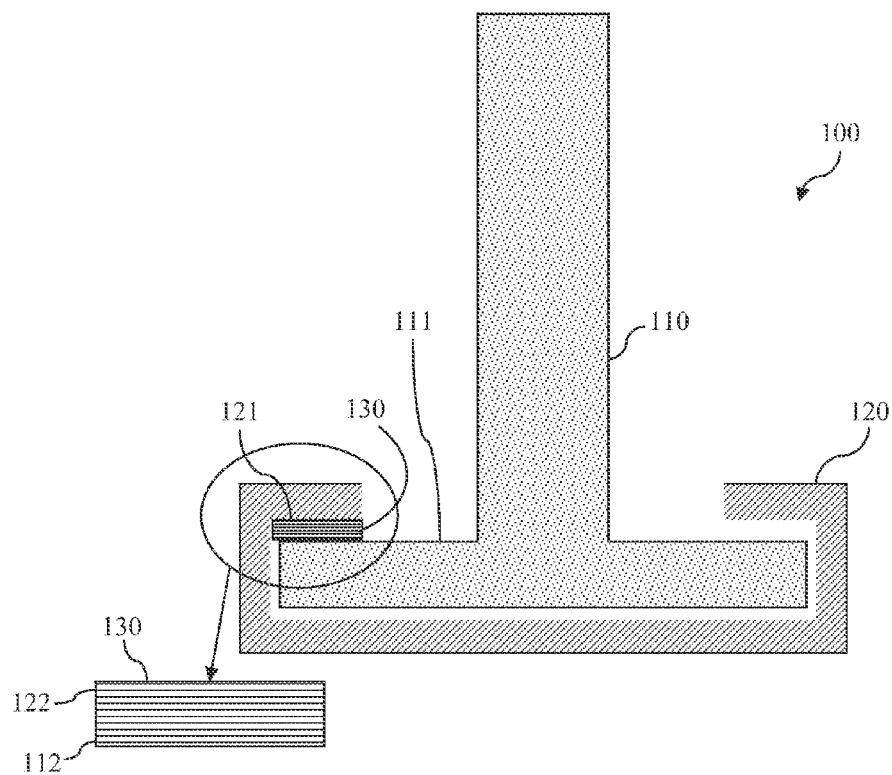
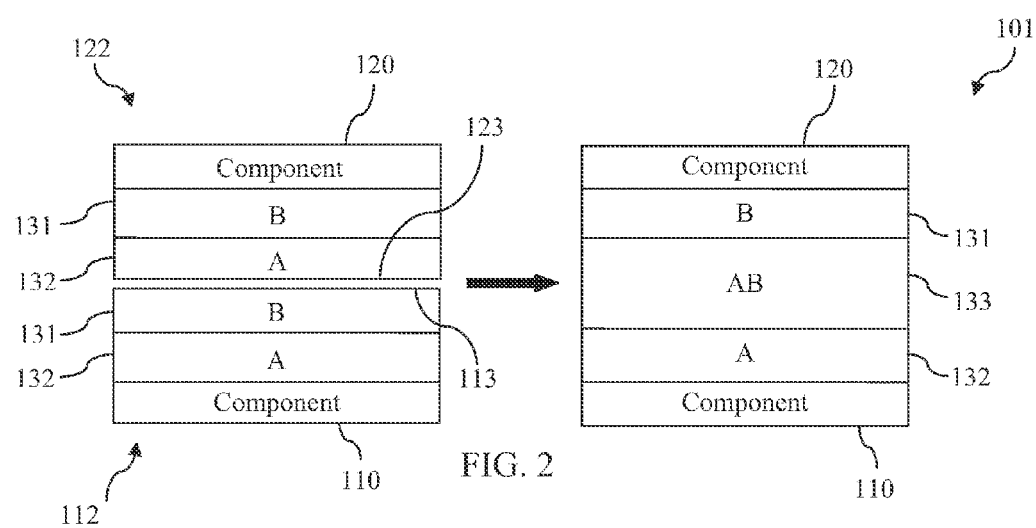
FIG. 1
FIG. 2

LAYERED DEPOSITION FOR REACTIVE JOINING OF COMPOSITES

TECHNICAL FIELD

The present invention generally relates to joining composites, and more particularly, but not exclusively, to reactive joining of composites.

Present approaches to joining composites suffer from a variety of drawbacks, limitations, disadvantages and problems including those respecting component complexity and others.

SUMMARY

One embodiment of the present invention is a unique composite joint. Other embodiments include apparatuses, systems, devices, hardware, methods, and combinations for joining composites. Further embodiments, forms, features, aspects, benefits, and advantages of the present application shall become apparent from the description and figures provided herewith.

Inadequate sealing in composite joints can cause cooling air leakage and thermal stresses in high temperature applications such as gas turbine engines. The complexity in manufacturing shapes and large sizes without joints can increase tooling costs. Other manufacturing limitations such as joining process temperatures can limit the materials available where dissimilar matrices and metal to CMC joints are not possible.

BRIEF DESCRIPTION OF THE FIGURES

FIG. 1 is an illustration of system of one embodiment of the present application.

FIG. 2 is an illustration of a reaction of one embodiment of the present application.

DETAILED DESCRIPTION OF THE ILLUSTRATIVE EMBODIMENTS

Figure 3:
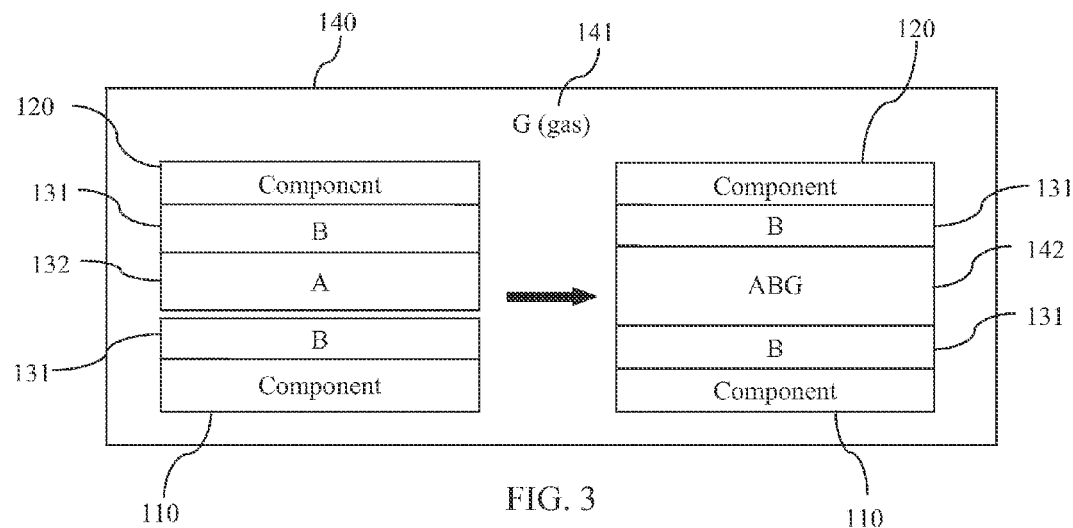
FIG. 3 is an illustration of another reaction of one embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an embodiment of the present application is illustrated showing two gas turbine engine components to be joined to form an assembly 100. A first gas turbine engine component 110 includes a first material and a second material in a first arrangement 112 on a first surface 111 of the first gas turbine engine component 110 as part of an alternating layer region 130. The first arrangement 112 has a first outer coating 113 including the first material. The first material and the second material are selected to create a thermodynamic non-equilibrium condition between them.

A second gas turbine engine component 120 includes the first material and the second material in a second arrangement 122 on a second surface 121 of the second gas turbine engine component 120 as part of an alternating layer region 130. The second arrangement 122 has a second outer coating 123 including the second material. The composition of the second outer coating 123 being different from the composition of the first outer coating 113.

An assembly formed by at least two components can refer to multiple components placed in close proximity and perhaps in an interlocking manner. The components can maintain separability and some degree of relative movement. With this assembly, the outer coating of the alternating layers of each component can be in contact with the other to allow an interaction between the materials or constituents of the alternating layers. An assembly can also refer to a combination of components which have been bound together as with an embodiment of the present application having limited relative movement. For one embodiment as shown in FIG. 1, the first component 110 is configured to fit against the second component 120 with the alternating layer region 130 in contact and forming the assembly 100.

FIG. 1 and FIG. 2 provide further detail regarding embodiments of the alternating layer region 130. The first arrangement 112 has a first outer coating 113 including the first material. The second arrangement 122 has a second outer coating 123 including the second material. The composition of the second outer coating 123 being different from the composition of the first outer coating 113.

In various embodiments, the components of an assembly can be operable as part of a gas turbine engine. Gas turbine engine assemblies can include, but are not limited to, combustion turbo exhaust component assemblies. Gas turbine engine assemblies can experience high temperature conditions during operation. Various high temperature gas turbine engine components can include vanes, blades, blade tracks, combustor liners, nozzles, shroud rings, buckets and the like. The gas turbine engine assemblies can include portions of such gas turbine engine components being brought together to form the gas turbine engine component. Other assemblies can include the combination of various gas turbine engine components creating a larger assembly.

Gas turbine engine components can also vary in the type of materials used in manufacture. Components can be at least partially metallic or ceramic. In one embodiment, a first component can be a ceramic material with a first matrix material and a second component can be a ceramic material with a second matrix material where the first matrix material and the second matrix material can be dissimilar. In another embodiment, the first component can be a ceramic matrix composite material and the second component can be a metallic material. In yet another embodiment, the materials of both components can be the same or similar.

More detail of an exemplary illustration of the joint between the two components 110,120 is shown in FIG. 2. For this embodiment, a first arrangement of reaction layers 112 is formed by alternating at least one layer of a first constituent 131 and at least one layer of a second constituent 132 on the surface of a first ceramic composite component 110. A second arrangement of reaction layers 122 is formed by alternating layers of the first constituent 131 and the second constituent 132 on the surface of a second gas turbine engine component 120.

The first ceramic composite component 110 with a first outer coating 113 of the first arrangement of reaction layers 112 can include the first constituent 131. The second component 120 with a second outer coating 123 of the second arrangement of reaction layers 122 can include the second constituent 132. The outer portion or coating of the alternating layers can be the top layer or surface of each arrangement of layers for each component. The composition of the outer coatings of either component can contain either the first constituent or the second constituent where the opposing outer coating includes a complimentary constituent to form a non-equilibrium condition. When the components are brought together, the outer coatings are placed in contact. When one outer coating includes one part of the non-equilibrium condition and the other outer coating includes the other part of the non-equilibrium condition, bringing the two coatings within a reactive range creates the non-equilibrium condition. In the embodiment shown, the second outer coating 123 contains the second constituent 132 while the first outer coating 113 contains the first constituent 131.

Bringing the alternating layers of the components together as shown in the highlighted view of FIG. 1 includes direct contact of the layers. The space between the outer coatings shown in FIG. 2 is for illustrative purposes to distinguish the two coatings. The two coatings are separate coatings of the two components which are brought together when the first component is adjoined to the second component. The coatings are in contact sufficient to create a non-equilibrium condition to promote a diffusion reaction forming a reaction bond between the components.

The first component 110 and the second component 120 can be arranged or assembled where the first component fits against the second component with the first outer surface 113 in contact with the second outer surface 123 to form a combined component 100. The first and second outer surfaces 113,123 can be representative of alternating layer regions repeated or applied multiple times or in multiple places on the components. The application of the alternating layers can be either sequential or at the same time along the first and second components 110,120. The materials applied can vary with the location of the regions in relation to the joint between components. Joining locations and material applications of the arrangement of layers 111,112 can be a function of the components and the joint geometry as well as the component materials.

The layers or regions in an arrangement can be distinguished by changes in at least one property when moving from one location to another of the coating arrangement. The changes can be abrupt or gradual. One example is an embodiment with a first region having a majority concentration of a first element. A relatively sharp change in concentration can be present when moving from the first region to a second region. The second region can have a majority concentration of a second element. In other variations, a predominant concentration of the first element in the first region can gradually transition to a predominant concentration of the second element in the second region.

A coating of alliterating layers including the arrangements of layers 112,122 can be applied by various methods selected in relation to the joining material and the joint geometry. The alternating layers can be applied by at least one process such as, but not limited to, direct vapor deposition, chemical vapor deposition, plasma spraying, laser vapor deposition, and electron beam physical vapor deposition. For some embodiments, layers can be 0.01-5 um thick. For other embodiments, the component joint surface can require a non-line-of-sight application; therefore a direct vapor deposition process can be used. Alternating layers can further refer to various patterns of layers or regions when the pattern is either regular or irregular depending on the number and type of layers and constituents. Layer patterns can be repeated once, multiple times or not at all. The pattern of the alternating layers can allow the selection of subsequent layers or constituents to be different in some way from the preceding or succeeding layer or constituent.

An element or constituent composed within the alternating layers can include a single chemical element, a mix of multiple elements, a simple or complex compound, and various phases of elements, compounds and materials. In various embodiments, constituents can include elements such as titanium, zirconium, niobium, vanadium, hafnium, tantalum, molybdenum, chromium, tungsten, silicon, carbon, boron, aluminum, and nickel for example. The constituents are chosen in response to the creation of a non-equilibrium condition such as a system with a negative Gibbs free energy system as discussed in further detail below.

Returning to FIG. 2, a bond structure 101 is formed between the first component 110 and the second component 120 during an equilibrium reaction and includes a product AB of the equilibrium reaction in the bond layer 133. In one embodiment, the bond structure 101 can include a graded bond structure having at least one compound formed from the first constituent 131 and the second constituent 132. In other embodiments, the bond layer can include a diffusion layer at the interface of the components and an interlayer of constituent compounds such as carbides, nitrides, borides, silicides, and combinations thereof.

When the first constituent 131 and the second constituent 132 are selected to produce a thermodynamic non-equilibrium condition between the first and second constituents 131,132, a self-propagating reaction of the first constituent 131 and the second constituent 132 can drive the thermodynamic non-equilibrium condition toward a thermodynamic equilibrium condition. A thermodynamic non-equilibrium condition is present in a system that is not in a state of balance and where there are net flows of matter or energy, phase changes, unbalanced potentials or driving forces. Non-equilibrium can be expressed in various ways including an unbalanced chemical potential and a negative Gibbs free energy, for example. An unbalanced chemical potential or diffusive non-equilibrium represents a system's potential for moving a reaction in a particular direction. Gibbs free energy or free enthalpy represents the obtainable process-initiating work of a thermodynamic system. A system can move from a negative to a positive Gibbs free energy by rearranging constituents to form structures and compounds with more free energy. A system with a negative Gibbs free energy attempts a transformation to minimize the chemical potential of the system and move to a positive Gibbs free energy.

A system in non-equilibrium has the potential for initiating work and driving the system to equilibrium. By selecting the materials to create a non-equilibrium state, the system can have the potential to drive a reaction with the selected materials and form an equilibrium state. The formation of an equilibrium state can be the formation of a reaction bond including the selected materials. The reaction bond forms as a result of the system being driven from a non-equilibrium state to an equilibrium state. For one embodiment, the equilibrium state can include a reaction layer arrangement formed with at least a bond layer including a first material and a second material.

In one embodiment, the self-propagating reaction of the non-equilibrium state can be facilitated by applying an energy to the contacting alternating layers between a first component adjoined with a second component. This energy can include electromagnetic energy, radiant energy, electrical energy, thermal energy and the like. Energy sources can include various forms such as, but are not limited to, the following:

- Furnaces—an assembly is placed in a high temperature furnace and rapidly heated to insure a self-propagating high-temperature synthesis (SHS) reaction.
- Electrical sparks—a voltage source is applied to exposed ends of an assembly joint in order to initiate the reaction forming a propagation wave which reacts along the length of the assembly joint.
- Quartz lamp heaters—localized and rapid heating by high intensity lamps is provided to an assembly joint.
- Torches (plasma, oxy-acetylene, etc.)—local heating by means of an external flame is provided to an assembly joint to create a self-propagating reaction wave.
- Thermite—the coating layers of Al and $Fe_2O_3$ are added to an assembly joint where the reaction proceeds as a result of adding another energy source to activate the thermite which provides additional energy that can drive the reaction to completion.
- Inertia welding—using available inertia welding technology, components are imparted with relative motion and force is applied to generate energy through friction. Rotary inertial welding involves a stationary component and a second component where the second component is revolving at a high rpm rate. Once the revolving component reaches the set rpm, the components are pressed into contact resulting in frictional heating.
- Lasers—similar to laser welding, high intensity laser energy is selectively applied at an assembly joint as well as near the assembly joint to manage thermal stresses.
- Electron beams—similar to electron beam welding, an electron beam heats and/or melts materials in and around an assembly joint.
- Direct resistance heating—a positive and negative electrode are applied directly to the component to impart a current flow and resistive heating. The terminals can be applied strategically to heat the part uniformly or to localize the heating effect.
- Induction heating—induction is applied directly to one or both materials or to a susceptor for local or bulk radiation.

In one example, the energy source can be selected as a function of the size and complexity of the system and the materials being applied. In various embodiments, one or more energy sources can be applied to a system concurrently, sequentially, and in variable locations, for example. Applied energy can facilitate an equilibrium reaction which drives the system from non-equilibrium to equilibrium. Equilibrium can be a partial completion of a reaction with remaining reactants available. Equilibrium is a status that is relative and can be non-static in nature. Facilitating can include accelerating the reaction between the constituents. Various combinations of materials can produce a non-equilibrium or negative Gibbs free energy condition but the reaction to bring the system to equilibrium can be time prohibitive, for example. In one embodiment, the applied energy can facilitate such a reaction by accelerating the reaction rate. In other embodiments, the equilibrium reaction can require a threshold energy to initiate the equilibrium reaction. The intensity and duration of the applied energy can vary as a function of the materials selected and the parameters of the equilibrium reaction.

Additionally, the equilibrium reaction can take place in various atmospheres which can be selected based on the constituents or materials applied in the alternating layers and the components. Parameters for an atmosphere can include temperature, pressure and composition. Temperature can be at room temperature or at an elevated temperature, for example. Pressure can be at various levels, such as but not limited to, ambient, atmospheric and in a vacuum. Atmosphere composition can include a pure gas or a mix of gases where the gas or gases can be nonreactive gases such as, but not limited to, argon and relatively reactive gases such as, but not limited to, hydrogen, oxygen and nitrogen.

In one embodiment such as shown in FIG. 3, a first component 110 and a second component 120 with alliterating layers can be placed within an atmosphere 140. A gas composition 141 in the atmosphere 140 can include a reactant G. The reactant G supplied in the atmosphere 140 can participate in the equilibrium reaction to form compounds of G. The components 110,120 show alliterating layers 131,132 of constituents A and B. Following the reaction, a diffusion bonding layer 142 is shown formed from constituents A, B and G. The reactant G can be, for example, nitrogen where the reaction creates nitrides in the resulting layers. Gases can provide advantages and disadvantages. For example, oxygen can aide in the wetting of some brazing applications while oxygen and moisture can be detrimental because of oxidation reactions. The application of an atmosphere and a gas reactant G can be selected in response to the other constituents of the non-equilibrium reaction and the components being joined together.

Figure 4:
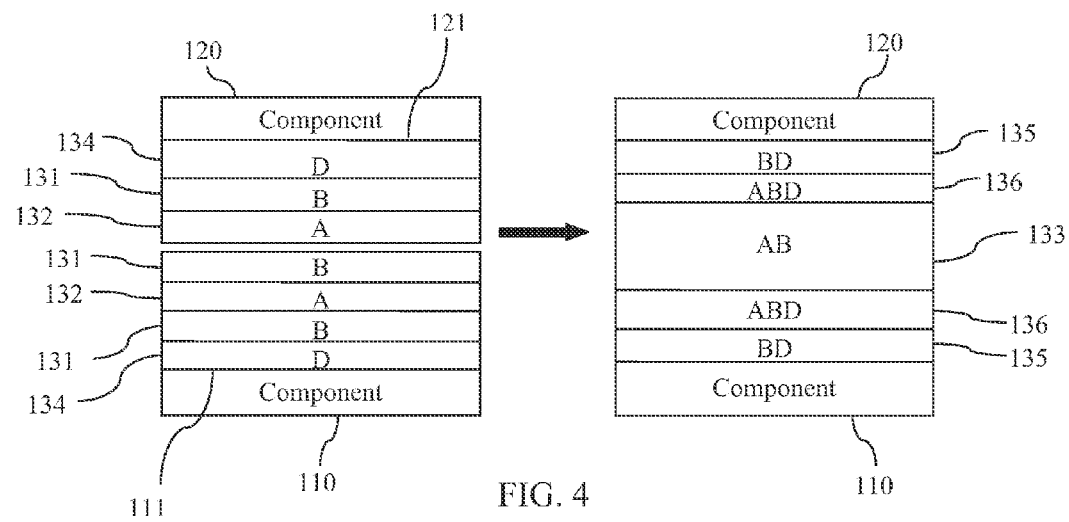
FIG. 4 is an illustration of yet another reaction of one embodiment of the present application.

FIG. 4 shows another embodiment where the alternating layers 131,132 of constituents A and B can be applied to the components 110,120 and the components 110,120 can have an intermediate layer 134 on the surfaces 111, 121. In various embodiments, the intermediate layer can perform various functions including environmental protection, bond enhancement, chemical compatibility and so forth. In a further embodiment, the intermediate layer 134 can participate in the bonding reaction between constituents A and B.

During the reaction of the embodiment shown in FIG. 4, a constituent D of the intermediate layer 134 reacts to form a product layer 135 with constituents B and D. Another product layer 136 is formed which includes constituents A, B and D. A bond layer 133 is formed including constituents A and B. While the components 110,120 are shown in FIG. 4 with the same intermediate layer 134, the intermediate layers and constituents can vary between the components thereby creating varying reaction layers. In one embodiment, one component can have an intermediate layer while the other component does not.

Figure 5:
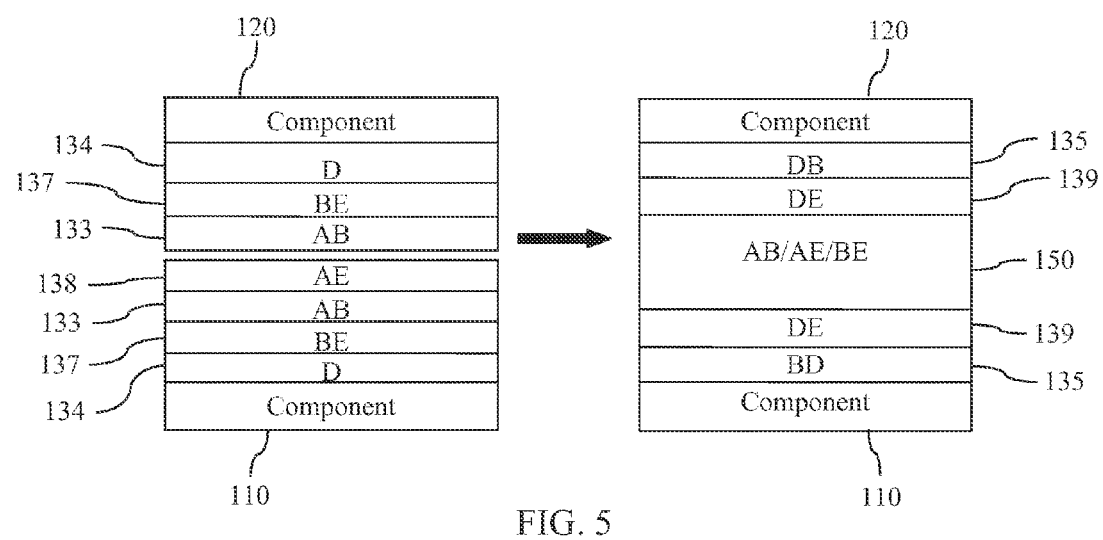
FIG. 5 is an illustration of still another reaction of one embodiment of the present application.

In further embodiments, the temperature and chemical stability of a reaction system can be approached with complex layers and multiple constituents. Multiple constituents can be selected to produce a negative Gibbs free energy for the joint parameters of the components. An exemplary embodiment is shown in FIG. 5 where at least one additional constituent can be applied with a first constituent and a second constituent to create a self-propagating reaction to bind a first component with a second component. Layers of the constituents are applied to the surface of each component at the joint location. The components are assembled with the outer layers of each component in direct contact. The outer layers include complimentary constituents to create the non-equilibrium condition.

In the pre-reaction layers, multiple constituents can be present in separate micro-phases, separate macro-phases, compounds, solution, and various other forms. A first outer surface layer 138 of a first component 110 includes the constituents A and E. A second outer surface layer 133 of a second component 120 includes the constituents A and B. Constituents A and E of the first outer surface layer 138 were chosen to produce a non-equilibrium condition when in proximity to the second outer surface layer 133 with constituents A and B. An additional layer 137 is shown to include constituents B and E. An intermediate layer 134 of constituent D is also shown as an alternative.

Energy can be applied to the joint and a reaction can take place creating a bond or diffusion layer 150 including various forms of AB, AE, and BE. These materials can be formed in a single compound, various phases within another and the like. Other layers can be created, as shown in FIG. 5, with a product layer 139 of constituents D and E and a product layer 135 of B and D. The chemical composition and physical microstructure of the bond layer and any intermediary layers are a function of the constituents and process parameters.

One particular example would include a set of alternating layers with constituents such as Zr—B and Si—C. The equilibrium reaction would create a joint with a bond layer containing $ZrB_2$ and SiC. This bond layer can provide oxidation resistance and chemical inertness up to 3000° F.

In another embodiment, the first and second surfaces of the first and second parts can be machined to improve or reduce the surface roughness of the parts in the bonding area. Surface roughness can affect the application of a coating. A smooth surface can also affect the degree of surface area contact between the alternating layer sets. The degree of contact can in turn affect the rate of reaction between the constituents of the reaction layers. Machining the surfaces can include various processes known to one skilled in the art.

In yet another embodiment, a porosity reducing process can be applied following the equilibrium reaction to reduce porosity that may be present in the joint due to various factors related to the reaction. Self-propagating reactions can create continuous porous networks that can be infiltrated to provide various characteristics. Materials for infiltration can include, but are not limited to, preceramic polymer, standard braze alloy, molten metal, metal compounds and so forth. The infiltrating material can be selected based on the component material, the constituents or diffusion materials, operating parameters and the like.

In one exemplary system, two gas turbine engine components formed with a ceramic matrix composite are to be joined. The component surfaces are machined to reduce surface roughness in each binding area. Two constituents for a reactive coating are selected in relation to parameters such as operation temperatures, process temperatures, component geometry, component material and the like. For this example, the alternating layers include layers of titanium and carbon. An intermediate layer of silicon can also be applied to aide with bonding and compatibility.

The components are assembled where at least a portion of the joining surfaces include the alternating layers. Tooling can be incorporated to locate and/or apply a load to the joined components. The direct contact of the alternating layers of the adjoining components creates a non-equilibrium condition with a negative Gibbs free energy and thereby produces a self-propagating reaction. In an embodiment with layers of titanium and carbon, the reaction has a negative Gibbs free energy at 298K.

The reaction can be facilitated with an applied energy which drives the non-equilibrium condition to an equilibrium condition. The energy can be applied in various forms and from various sources. As a result of the equilibrium reaction facilitated by the applied energy, the embodiment with the titanium and carbon alternating layers and an intermediate layer of silicon can form a graded bond structure consisting of titanium silicide, Ti—Si—C ternary compounds, and titanium carbide. In addition to the reaction of this embodiment, other embodiments can include layered structures to form carbides, borides, silicides, nitrides and combinations thereof.

Further, the bond structure can include connected porosity resulting from the reaction. In one alternative, the porosity can be allowed to remain in the joint. In another alternative, an additional process step can be added to fill the porosity. The additional process step can include melt infiltration.

In another example, two ceramic matrix composite components are coated with alternating layers of silicon and carbon by chemical vapor deposition in an atomic ratio of 1:1. A nominal thickness of a carbon layer can be 1 μm. The components are clamped in a fixture and placed into a vacuum furnace. The components are heated to 1000° C. by radiation. Focused energy is applied to the joint by electron beam to facilitate the reaction. The reaction progresses to a level of completion. The components are cooled and removed from the furnace having a bond layer of silicon carbide (Si—C).

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    applying layers of a first constituent and a second constituent on a surface of a ceramic matrix composite component to form a first outer coating, the first outer coating including the first constituent;
    applying layers of the first constituent and the second constituent on a component surface of a gas turbine engine component to form a second outer coating, the second outer coating including the second constituent, wherein the first constituent and the second constituent are capable of producing a thermodynamic non-equilibrium condition between the first constituent and the second constituent;
    forming a component assembly with the ceramic matrix composite component coupled to the gas turbine engine component and with the first outer coating of the ceramic matrix composite component in contact with the second outer coating of the gas turbine engine component;

adding an energy to facilitate an equilibrium reaction between the first constituent of the first outer coating and the second constituent of the second outer coating;

as a result of the adding the energy, forming a bond structure in the component assembly with a product of the equilibrium reaction, the bond structure affixing the ceramic matrix composite component to the gas turbine engine component, wherein the bond structure defines a level of porosity; and applying a melt infiltrant to the bond structure to at least partially reduce the level of porosity in the bond structure.

2. The method of claim 1, wherein the applying layers on at least one of the ceramic matrix composite component or the gas turbine engine component further includes applying layers of the first constituent, the second constituent, and a third constituent with the first constituent, the second constituent, and the third constituent capable of producing the thermodynamic non-equilibrium condition between the first constituent, the second constituent, and the third constituent.

3. The method of claim 1, wherein the adding the energy results in an acceleration of the equilibrium reaction.

4. The method of claim 3, further including coating at least one of the ceramic matrix composite component and the gas turbine engine component with an intermediate layer before applying the layers of the first constituent and the second constituent on the at least one ceramic matrix composite component or the gas turbine engine component on which the intermediate layer is applied.

5. The method of claim 4, wherein the adding the energy further includes adding the energy to facilitate the equilibrium reaction in an atmosphere of at least one reactive gas selected from a group consisting of: hydrogen, oxygen, and nitrogen.

6. The method of claim 5, further including machining at least one of the surface of the ceramic matrix composite component and the component surface of the gas turbine engine component to reduce surface roughness.

7. The method of claim 4, wherein the intermediate layer comprises elemental silicon.

8. The method of claim 1, wherein the first constituent and the second constituent each comprise an element selected from the group consisting of titanium, zirconium, niobium, vanadium, hafnium, tantalum, molybdenum, chromium, tungsten, silicon, carbon, boron, aluminum, and nickel, and wherein the elements of the first constituent and the second constituent are different.

9. A method comprising:

selecting a first constituent and a second constituent capable of producing a negative Gibbs free energy condition between the first constituent and the second constituent;

applying alternating layers of the first constituent and the second constituent to a ceramic matrix composite component and a second component, the ceramic matrix composite component and the second component capable of operation in a gas turbine engine;

adjoining the ceramic matrix composite component directly to the second component, the ceramic matrix composite component contacting the second component through the alternating layers;

reacting the first constituent and the second constituent in the alternating layers with an applied energy to drive the negative Gibbs free energy condition between the first constituent and the second constituent toward an equilibrium condition;

forming a reaction bond between the ceramic matrix composite component and the second component from the alternating layers including the first constituent and the second constituent as a result of the driving the negative Gibbs free energy condition toward the equilibrium condition, wherein the reaction bond defines a level of porosity;

applying a melt infiltrant to the reaction bond to at least partially reduce the level of porosity in the reaction bond; and creating a gas turbine engine assembly with the reaction bond binding the ceramic matrix composite component to the second component.

10. The method of claim 9, wherein the applying alternating layers further includes applying an intermediate constituent between the alternating layers and at least one of the ceramic matrix composite component and the second component.

11. The method of claim 10, wherein the selecting the first constituent and the second constituent further includes selecting at least one additional constituent to produce the negative Gibbs free energy condition with the first constituent, the second constituent and the at least one additional constituent.

12. The method of claim 11, wherein the reacting with the applied energy results in an acceleration of the driving of the negative Gibbs free energy condition toward the equilibrium condition.

13. The method of claim 11, wherein the reacting with the applied energy results in an initiation of the driving of the negative Gibbs free energy condition toward the equilibrium condition.

14. The method of claim 9, wherein the applying alternating layers on at least one of the ceramic matrix composite component or the second component further includes applying alternating layers with at least one application process selected from a group consisting of: direct vapor deposition, chemical vapor deposition, plasma spraying, laser vapor deposition, and electron beam physical vapor deposition.

15. The method of claim 9, wherein the reacting further includes reacting under at least one environmental condition selected from a group consisting of: ambient air, vacuum, pure gas, mixed gas, room temperature, and above room temperature.

* * * * *